Aug. 12, 1952  G. W. JOHNSON  2,606,525
POULTRY NEST

Filed July 7, 1947  2 SHEETS—SHEET 1

INVENTOR,
Gordon W. Johnson.
BY
Roy E. Hamilton
Attorney.

Aug. 12, 1952  G. W. JOHNSON  2,606,525
POULTRY NEST

Filed July 7, 1947  2 SHEETS—SHEET 2

INVENTOR,
Gordon W. Johnson.
BY
Roy E. Hamilton
Attorney.

Patented Aug. 12, 1952

2,606,525

UNITED STATES PATENT OFFICE 2,606,525

POULTRY NEST

Gordon W. Johnson, Raytown, Mo., assignor to Gordon Johnson Company, Kansas City, Mo.

Application July 7, 1947, Serial No. 759,435

4 Claims. (Cl. 119—48)

This invention relates to new and useful improvements in a poultry nest, and has particular reference to a nest adapted to encourage the laying of eggs and to reduce the contamination and breakage of said eggs.

The principal object of the present invention is the provision of a poultry nest having its floor sloping to one edge thereof and a receptacle formed along said lower edge whereby eggs laid in the nest will roll down said slope into said receptacle.

Another object is the provision of a hen's nest wherein the floor is comprised of the planar end surfaces of a plurality of upwardly extending resilient fingers, said fingers being of graduated lengths to cause said floor to slope, said fingers serving also to provide a resilient support for the hen, to allow for air circulation around eggs beneath the hen to prevent incubation thereof, and to provide space therebetween for lime or a similar substance for disinfecting purposes and for absorbing the moisture from eggs which may be broken in the nest.

Still another object is the provision of a hen's nest having a shallow tray for containing lime so disposed that a hen must walk through said tray to approach said nest, thereby killing any mites or other vermin which may be clinging to the feet and legs of the fowl.

Other objects are simplicity and economy of construction, and ease and convenience of use.

With these objects in view, as well as other objects which will appear during the course of the specification, reference will now be had to the drawings, wherein.

Figure 1:
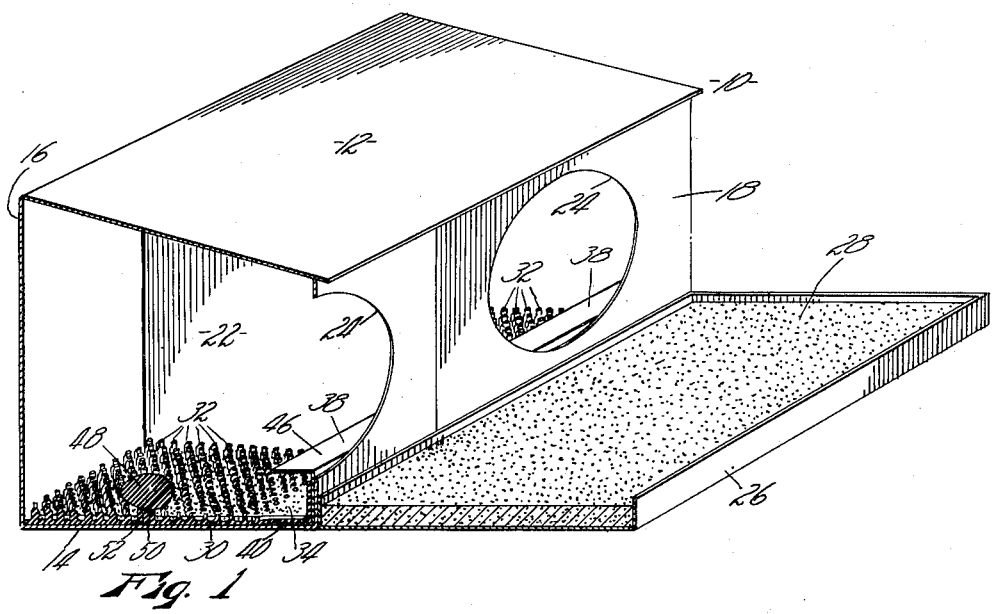
Figure 1 is a cross-sectional perspective view of a representative form of hen's nest embodying the present invention.
Figure 2:
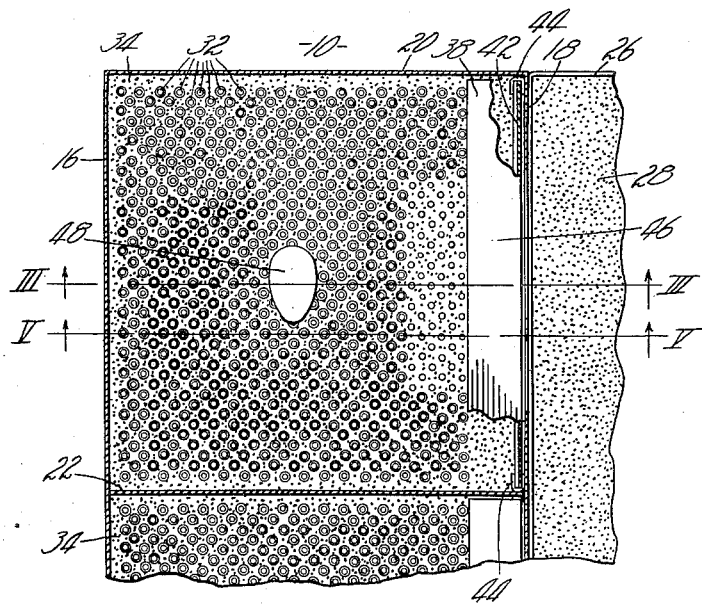
Fig. 2 is an enlarged horizontal mid-section of the nest shown in Figure 1, with parts broken away.

Like reference numerals apply to similar parts throughout the several views, and the numeral 10 applies to a substantially rectangular nest housing having a top 12, bottom 14, back 16, front 18, ends 20, and internal partitions 22 dividing the housing into individual nest compartments. Access to each compartment is provided by an aperture 24 formed in housing front 18. A shallow tray 26 is welded or otherwise fixed to front 18 and extends horizontally therefrom a distance sufficiently great that a hen must walk through said tray to reach any of apertures 24. Said tray is adapted to carry a layer of lime 28 for disinfecting the feet of the hen and killing any vermin which might be attached thereto.

The bottom 14 of each nest compartment is covered with a pliable sheet 30 of rubber or other resilient, flexible material, said sheet having a plurality of upwardly extending resilient fingers 32 formed integrally therewith. The planar upper ends of said fingers form a surface sufficiently continuous to furnish a suitable nest surface. The upper end portion of each finger is reduced in diameter for added resilience, while the thicker base portion provides adequate support. Thus it is apparent that breakage of eggs deposited in the nest is reduced to a minimum. In nests of the ordinary type comprising a layer of straw on a hard floor, the straw is likely to become thin at the center, or leave a portion of the floor exposed on which eggs may be broken.

If thin or soft shelled eggs are laid in a nest embodying this invention, the contents thereof will flow in the spaces between fingers 32, thus keeping the hen and other eggs in the nest much cleaner, since they are supported on the upper ends of said fingers. A layer of lime 34 may be deposited over sheet 30 and between fingers 32, said lime serving to absorb moisture and to act as a disinfectant.

Figure 3:
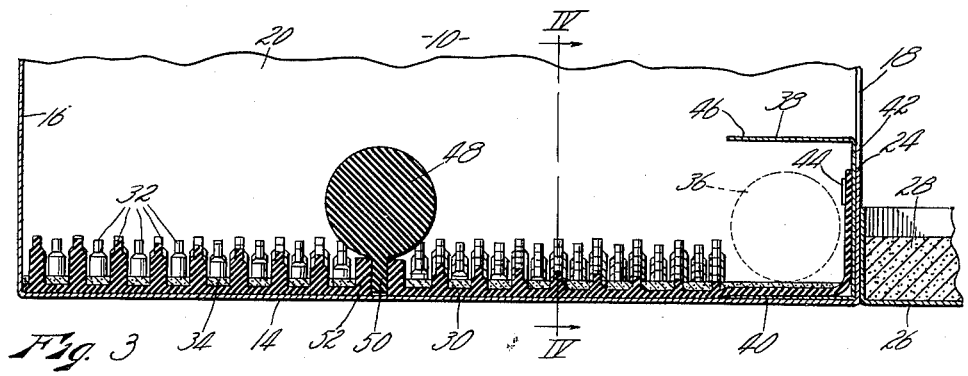
Fig. 3 is an enlarged fragmentary vertical section taken on line III—III of Figure 2.
Figure 4:
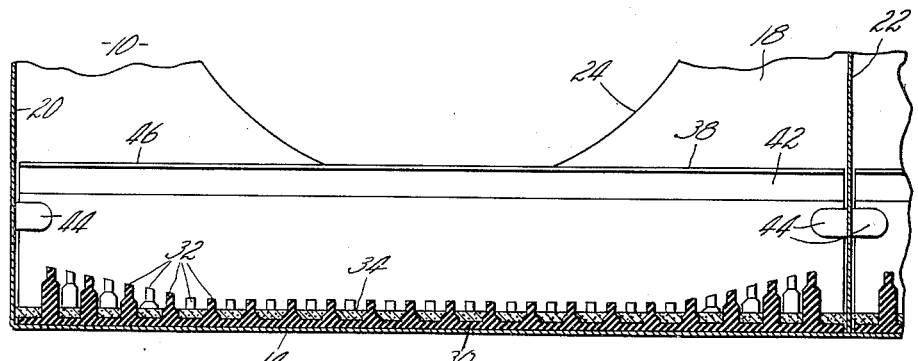
Fig. 4 is a vertical section taken on line IV—IV of Figure 3.
Figure 5:
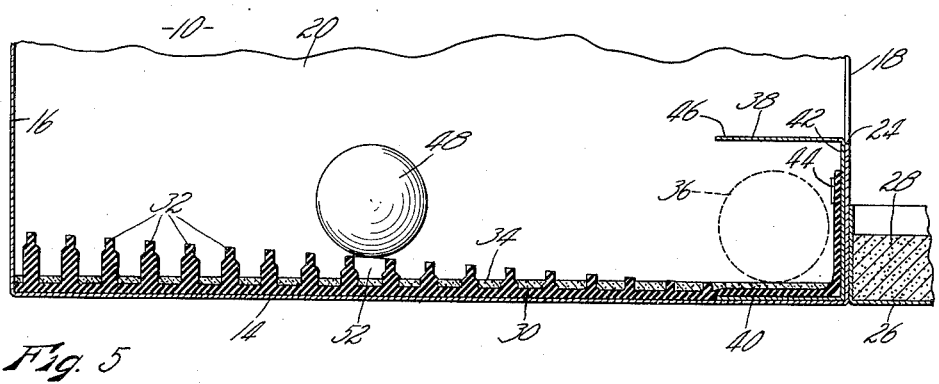
Fig. 5 is an enlarged fragmentary vertical section taken on line V—V of Figure 2, with all of the resilient fingers omitted except those actually intersected by said section line.

Fingers 32 are of graduated lengths so that the surface produced by their upper ends slopes inwardly and forwardly as best shown in Figures 4 and 5. Thus eggs deposited in the nest and working out from under the hen will roll toward the forward edge of the nest, as shown by egg 36 in Figures 3 and 5. At the edge of the nest, the egg rolls into an egg protector 38 comprising an elongated strip of sheet metal bent substantially in a U-shape. Said egg protector is disposed adjacent the inner surface of nest front 18 immediately beneath apertures 24 and extends substantially the entire width of the nest, opening rearwardly.

The lower horizontal leg 40 of said egg protector rests on the bottom 14 of the nest housing, and resilient sheet 30 extends over said leg and is bent upwardly at its forward edge to extend along vertical leg 42 of the egg protector. Said vertical portion of sheet 30 is removably fixed at its edges to vertical leg 40 by means of pliable clamps 44. Thus when an egg 36 rolls forwardly into egg protector 38 as shown in Figures 3 and 5, it is stopped by striking only the upturned portion of resilient sheet 30, and breakage is thereby prevented. Furthermore, upper horizontal leg 46 of the egg protector then projects over the egg, preventing the hen from pecking or breaking it. A person collecting eggs from the nest need only reach within the egg protector to find any eggs which have been laid in the nest.

A nest egg 48 for encouraging hens to enter the nest is made of rubber or other resilient material, and is provided with an outwardly extending finger 50 adapted to be frictionally engaged in a centrally disposed boss 52 formed integrally with resilient sheet 30. Since finger 50 and boss 52 are resilient, egg 48 is not rigidly positioned, but may be moved about slightly by the hen.

Thus it is apparent that a poultry nest has been produced which has many advantages. Egg breakage and egg contamination are reduced to a minimum. Eggs which do break are kept substantially out of contact with the hen and with other eggs. Incubation is prevented by circulation of air about the eggs. The nest may be rapidly and easily cleaned by removing flexible sheet 30 from the nest housing. It is apparent that many minor changes of structure and arrangement of parts could be made without departing from the spirit of the invention, and it is therefore desired to be limited only by the scope of the appended claims.

What I claim is:

1. In a poultry nest of the class described, a housing provided with a floor, upstanding walls, and an entrance aperture, and a flexible sheet of resilient material covering the floor of said housing, said sheet being provided with a plurality of upwardly extending integral resilient fingers, said fingers being of gratuated lengths whereby their upper ends lie in a plane sloping downwardly toward one of said walls of the housing.

2. In a poultry nest of the class described, a housing provided with a floor, upstanding walls, and an entrance aperture, a flexible sheet of resilient material covering the floor of said housing, said sheet being provided with a plurality of upwardly extending integral resilient fingers, said fingers being of graduated lengths whereby their upper ends lie in a plane sloping downwardly toward one of said walls of the housing, and a receptacle disposed along said one wall of the housing for receiving eggs rolling down said sloping plane.

3. In a poultry nest of the class described, a housing provided with a floor, upstanding walls, and an entrance aperture, a flexible sheet of resilient material covering the floor of said housing, said sheet being provided with a plurality of upwardly extending integral resilient fingers, said fingers being of graduated lengths whereby their upper ends lie in a plane sloping downwardly toward one of said walls of the housing, and a receptacle disposed along said one wall of the housing for receiving eggs rolling down said sloping plane, said receptacle having a closed top for preventing the hen from destroying said eggs.

4. A poultry nest comprising a housing having a floor, upstanding walls, and an entrance aperture, an egg protector comprising a length of sheet material having a vertical leg extending along one wall of said housing, said protector having a substantially U-shaped cross-section, resting on the floor of said housing, and opening inwardly, and a flexible sheet of resilient material having a plurality of upwardly extending resilient fingers covering the floor of said housing, said fingers being of regularly graduated lengths with their upper ends lying in a plane sloping downwardly toward said egg protector, whereby eggs laid in said housing will roll into said egg protector, said flexible sheet extending into said egg protector and upwardly along the vertical leg thereof to cushion said eggs.

GORDON W. JOHNSON.

REFERENCES CITED

The following references are of record in the file of this patent:

UNITED STATES PATENTS

| Number | Name | Date |
|---|---|---|
| 579,407 | Pool | Mar. 23, 1897 |
| 762,562 | Strickler | June 14, 1904 |
| 886,151 | Olson | Apr. 28, 1908 |
| 1,032,741 | Clutter | July 16, 1912 |
| 1,042,494 | Smith | Oct. 29, 1912 |
| 1,238,349 | Shreve | Aug. 28, 1917 |
| 1,300,997 | Moyers | Apr. 15, 1919 |
| 1,402,790 | Olson | Jan. 10, 1922 |
| 1,431,278 | Backlind | Oct. 10, 1922 |
| 1,578,692 | Thrasher | Mar. 30, 1926 |
| 1,811,338 | Trullinger | June 23, 1931 |
| 1,828,406 | Grill | Oct. 20, 1931 |
| 1,892,235 | Esch | Dec. 27, 1932 |
| 1,914,160 | Pine | June 13, 1933 |
| 2,279,147 | Stimpson | Jan. 27, 1939 |

FOREIGN PATENTS

| Number | Country | Date |
|---|---|---|
| 19,081 | Great Britain | Nov. 20, 1902 |
| 15,845 | Netherlands | Jan. 15, 1927 |